US012570042B2

(12) United States Patent
Klimczak et al.

(10) Patent No.: US 12,570,042 B2
(45) **Date of Patent: \*Mar. 10, 2026**

(54) APPARATUS, SYSTEM AND METHOD FOR ENHANCED DRIVE FORCE IN AN ADDITIVE MANUFACTURING PRINT HEAD

(71) Applicant: JABIL INC., St. Petersburg, FL (US)

(72) Inventors: Scott Klimczak, St. Petersburg, FL (US); Luke Rodgers, St. Petersburg, FL (US); Darin Burgess, St. Petersburg, FL (US)

(73) Assignee: 3D Print Innovations, LLC

( * ) Notice: Subject to any disclaimer, the term of this patent is extended or adjusted under 35 U.S.C. 154(b) by 71 days.

This patent is subject to a terminal disclaimer.

(21) Appl. No.: 17/417,038

(22) PCT Filed: Dec. 17, 2019

(86) PCT No.: PCT/US2019/066760
§ 371 (c)(1),
(2) Date: Jun. 21, 2021

(87) PCT Pub. No.: WO2020/131818
PCT Pub. Date: Jun. 25, 2020

(65) Prior Publication Data
US 2022/0072774 A1 Mar. 10, 2022

Related U.S. Application Data

(60) Provisional application No. 62/782,284, filed on Dec. 19, 2018.

(51) Int. Cl.
*B29C 64/209* (2017.01)
*B29C 64/393* (2017.01)
(Continued)

(52) U.S. Cl.
CPC ............ *B29C 64/209* (2017.08); *B33Y 30/00* (2014.12); *B29C 64/393* (2017.08); *B33Y 50/02* (2014.12)

(58) Field of Classification Search
CPC ..... B29C 64/209; B29C 64/393; B29C 64/00; B29C 64/321; B29C 64/307;
(Continued)

(56) References Cited

U.S. PATENT DOCUMENTS 5,340,433 A * 8/1994 Crump ................... G05B 19/41
156/218
6,085,957 A * 7/2000 Zinniel .................. B65H 51/30
226/43
(Continued)

FOREIGN PATENT DOCUMENTS

CN 103112166 A * 5/2013
CN 105690768 A * 6/2016
(Continued)

OTHER PUBLICATIONS

Cho Hoon Je, et al, Filament feeding apparatus for 3D printer, Jan. 2023, EPO and Google, Espacenet (Year: 2023).*
(Continued)

*Primary Examiner* — Susan D Leong
*Assistant Examiner* — Jonathan B Woo
(74) *Attorney, Agent, or Firm* — Riverside Law LLP

(57) ABSTRACT

The disclosure is of and includes at least an apparatus, system and method for a print head for additive manufacturing. The apparatus, system and method may include two proximate hobs suitable to receive and extrude therebetween a print material filament for the additive manufacturing, each of the two hobs comprising a diameter of greater than 15 mm; at least one motor capable of imparting a rotation to a respective one of the two hobs, wherein the extrusion results
(Continued)

from the rotation; and an interface to a liquefier capable of outputting the extruded print material filament after at least partial liquefication by at least one nozzle heater to perform the additive manufacturing.

18 Claims, 7 Drawing Sheets

(51) Int. Cl.
    *B33Y 30/00*         (2015.01)
    *B33Y 50/02*         (2015.01)
(58) Field of Classification Search
    CPC ....... B29C 64/118; B33Y 30/00; B33Y 50/02;
                                 B33Y 10/00; B33Y 40/00
    See application file for complete search history.

(56)                References Cited

U.S. PATENT DOCUMENTS

| | | | | |
|---|---|---|---|---|
| 2001/0030383 | A1* | 10/2001 | Swanson | B33Y 70/00 |
| | | | | 242/570 |
| 2007/0003656 | A1 | 1/2007 | Labossiere et al. | |
| 2014/0159273 | A1 | 6/2014 | Koop | |
| 2014/0328963 | A1* | 11/2014 | Mark | B33Y 50/02 |
| | | | | 425/143 |
| 2015/0266243 | A1 | 9/2015 | Mark | |
| 2016/0046081 | A1 | 2/2016 | Kim et al. | |
| 2017/0028623 | A1* | 2/2017 | Evans | B29C 70/382 |
| 2017/0157826 | A1 | 6/2017 | Hishiki | |
| 2017/0266885 | A1* | 9/2017 | Gifford | B29C 64/321 |
| 2019/0193331 | A1* | 6/2019 | Welling | B33Y 30/00 |
| 2021/0046702 | A1* | 2/2021 | Groffman | B29C 64/227 |
| 2021/0138572 | A1* | 5/2021 | Taig | B23K 9/125 |

FOREIGN PATENT DOCUMENTS

| | | | | | |
|---|---|---|---|---|---|
| CN | 105690771 | A | * | 6/2016 | ............ B33Y 30/00 |
| CN | 106696274 | A | * | 5/2017 | |
| CN | 107415226 | A | * | 12/2017 | ............ B33Y 40/00 |
| CN | 108582781 | A | | 9/2018 | |
| CN | 108582789 | A | * | 9/2018 | ........... B29C 64/321 |
| CN | 111278628 | | | 6/2020 | |
| FR | 3022826 | A1 | * | 1/2016 | ......... B29C 47/1054 |
| KR | 101762667 | B1 | * | 7/2017 | ............ B29C 67/00 |
| WO | WO-2016121796 | A1 | * | 8/2016 | ............ B29C 67/00 |
| WO | 2018-170213 | A1 | | 9/2018 | |
| WO | 2019070902 | | | 4/2019 | |

OTHER PUBLICATIONS

Ji M. et al., "English Machine Translation of CN103112166A Extrusion device applied to fused deposition modeling high speed 3D (Three Dimensional) printer." 2023. EPO. Espacenet (Year: 2023).*

EPO. "European Search Opinion for EP 3898189." 2022. EPO. Espacenet (Year: 2022).*

EPO. "Annex to Communication for EP 3898189." 2023. EPO. Espacenet (Year: 2023).*

Hayashida T et al. "English Machine Translation of WO 2016121796 A1: Dispensing Head, Three-Dimensional Fabrication Device, and Three-Dimensional Fabrication Method." 2023. EPO. Espacenet. (Year: 2023).*

Gobillard J. "English Machine Translation of FR 3022826 A1." 2023. EPO. Espacenet. (Year: 2023).*

Ji M. English Machine Translation of CN-103112166-A. Nov. 22, 2024. EPO. Espacenet. (Year: 2024).*

Gao M. English Machine Translation of CN-107415226-A. Dec. 20, 2024. EPO. Espacenet. (Year: 2024).*

Comb J et al. "Control Parameters and Material Selection Criteria for Rapid Prototyping Systems". 1993. Retrieved from https://repositories.lib.utexas.edu/items/16d942bd-56d7-43b7-bf2d-5bc5827b2ed9 on Nov. 15, 2024 (Year: 1993).*

Nienhaus, V.; Spiehl, D.; Dorsam, E. Investigations on Roller-Based Filament Drives. J. Manuf. Mater. Process. 2021, 5, 53. Retrieved from https://www.mdpi.com/2504-4494/5/2/53 on Dec. 20, 2024. (Year: 2021).*

Chen X. "English Machine Translation of CN108582789A". Jan. 2, 2025. EPO. Espacenet. (Year: 2025).*

Lu Y. "English Machine Translation of CN105690768A". Jan. 2, 2025. EPO. Espacenet. (Year: 2025).*

Gao M. "English Machine Translation of CN106696274A". Jan. 2, 2025. EPO. Espacenet. (Year: 2025).*

Gong Y. "English Machine Translation of CN-105690771-A". Jan. 10, 2025. EPO. Espacenet (Year: 2025).*

Filament2print. "Which filament diameter is better: 1.75 mm or 3 mm?". Nov. 13, 2017. Accessed Jan. 13, 2025 from https://filament2print.com/en/blog/difference-filament-175mm-3mm (Year: 2017).*

MatterHackers. "Filament Comparison Guide". Dec. 4, 2013. Accessed Jan. 13, 2025 from https://web.archive.org/web/20131204213912/http://www.matterhackers.com/3d-printer-filament-compare#expand (Year: 2013).*

Bondtech. "Bondtech LGX™ Large Gears extruder is smarter, smaller, lighter". Apr. 2, 2021. Accessed Jan. 13, 2025 from https://web.archive.org/web/20210402223754/https://www.bondtech.se/product/lgx-large-gears-extruder/ (Year: 2021).*

Orbiter. "Orbiter v2.0 Summary". Dec. 11, 2021. Accessed Jan. 13, 2025 from https://web.archive.org/web/20211211192855/https://orbiterprojects.com/orbiter-v2-0/ (Year: 2021).*

MatterHackers. "Extruders 101: A crash course on an essential component of your 3D printer". Mar. 22, 2016. Accessed Jan. 13, 2025 from https://www.matterhackers.com/articles/extruders-101:-a-crash-course-on-an-essential-component-of-your-3d-printer (Year: 2016).*

DrDFlo. "Overview". Sep. 14, 2021. Accessed Jan. 13, 2025 from https://web.archive.org/web/20220119010827/https://www.drdflo.com/pages/Guides/How-to-Build-a-3D-Printer/Extruder.html (Year: 2021).*

Hayward, Mark. "3D Printer Extruder Filament Drive Gear Review & Benchmark". Nov. 23, 2013. Accessed Jan. 8, 2025 from https://airtripper.com/1676/3d-printer-extruder-filament-drive-gear-review-benchmark/ (Year: 2013).*

International Search Report, dated Jun. 25, 2020 for PCT/US2019/066760.

Written Opinion of the International Searching Authority, dated Jun. 25, 2020 for PCT/US2019/066760.

Chinese Office Action issued in App. No. CN202310664667 dated Jul. 21, 2025 (pp. 1-10).

* cited by examiner

APPARATUS, SYSTEM AND METHOD FOR ENHANCED DRIVE FORCE IN AN ADDITIVE MANUFACTURING PRINT HEAD

CROSS-REFERENCE TO RELATED APPLICATIONS

The present application claims benefit to International Application PCT/US2019/066760, filed Dec. 17, 2019, entitled: "Apparatus, System and Method For Enhanced Drive Force in an Additive Manufacturing Print Head," which claims priority to U.S. Provisional Application No. 62/782,284, filed Dec. 19, 2018, entitled: "Apparatus, System and Method For Enhanced Drive Force in an Additive Manufacturing Print Head," the entirety of which is incorporated herein by reference as if set forth in its entirety.

BACKGROUND

Field of the Disclosure

The present disclosure relates to additive manufacturing, and, more specifically, to an apparatus, system and method for enhanced drive force, such as with zero backlash, in an additive manufacturing print head.

Description of the Background

Additive manufacturing, including three dimensional printing, has constituted a very significant advance in the development of not only printing technologies, but also of product research and development capabilities, prototyping capabilities, and experimental capabilities, by way of example. Of available additive manufacturing (collectively "3D printing") technologies, fused deposition of material ("FDM") printing is one of the most significant types of 3D printing that has been developed.

FDM is an additive manufacturing technology that allows for the creation of 3D elements on a layer-by-layer basis, starting with the base, or bottom, layer of a printed element and printing to the top, or last, layer via the use of, for example, heating and extruding thermoplastic filaments into the successive layers. Simplistically stated, an FDM system includes a print head which feeds the print filament material through a heated nozzle to print, an X-Y planar control for moving the print head in the X-Y plane, and a print platform upon which the base is printed and which moves in the Z-axis as successive layers are printed.

More particularly, the FDM printer nozzle heats the thermoplastic print filament material received to a semi-liquid state, and deposits the semi-liquid thermoplastic in variably sized beads along the X-Y planar extrusion path plan provided for the building of each successive layer of the element. The printed bead/trace size may vary based on the part, or aspect of the part, then-being printed. Further, if structural support for an aspect of a part is needed, the trace printed by the FDM printer may include removable material to act as a sort of scaffolding to support the aspect of the part for which support is needed. Accordingly, FDM may be used to build simple or complex geometries for experimental or functional parts, such as for use in prototyping, low volume production, manufacturing aids, and the like.

However, the use of FDM in broader applications, such as medium to high volume production, is severely limited due to a number of factors affecting FDM, and in particular affecting the printing speed, quality, and efficiency for the FDM process. As referenced, in FDM printing it is typical that a thermoplastic is extruded, and is heated and pushed outwardly from a heating nozzle, under the control of the X-Y and/or Z driver of a print head, onto either a print plate/platform or a previous layer of the part being produced. More specifically, the nozzle is moved about by the robotic X-Y planar adjustment of the print head in accordance with a pre-entered geometry, such as may be entered into a processor as a print plan to control the robotic movements to form the part desired.

Thus, current limitations on the cost, efficiency, and performance of additive manufacturing often occur due to the nature of known print heads, such as those print heads typically provided in FDM printing. In short, in a typical known print head, print filament material is fed from a spool through, for example, two print hobs that serve to extrude the print filament material toward the "hot end" of the printer. In known embodiments, a stepper motor drives one of the hobs to press the print filament material against, and thereby cause to rotate, the other of the hobs in order to feed the print filament material from the spool to the hot end. However, the available forces that are typically applied by current print filament material feeds may score or warp the print filament material, if excessive, or may further subjects the print filament material to various undesirable effects, such as compression, crimping, friction, and lag if excessive or insufficient. Lagging of the print filament material, which may occur when high feed rate is needed by the print plan, but insufficient feed force is provided, may be particularly detrimental, at least in that the print filament material may curl or otherwise re-spool at the output from or input to the hobs, thereby jamming the printer.

Therefore, the need exists for an apparatus, system, and method for providing enhanced print filament material forces in an additive manufacturing print head.

SUMMARY

The disclosure is of and includes at least an apparatus, system and method for a print head for additive manufacturing. The apparatus, system and method may include two proximate hobs suitable to receive and extrude therebetween a print filament material for the additive manufacturing, each of the two hobs comprising a diameter of greater than 15 mm; at least one motor capable of imparting a rotation to a respective one of the two hobs, wherein the extrusion results from the rotation; and an interface to a liquefier capable of outputting the extruded print filament material after at least partial liquefication by at least one nozzle heater to perform the additive manufacturing.

Thus, the disclosed embodiments provide an apparatus, system, and method for an apparatus, system and method for enhanced drive force in an additive manufacturing print head.

BRIEF DESCRIPTION OF THE DRAWINGS

The disclosed non-limiting embodiments are discussed in relation to the drawings appended hereto and forming part hereof, wherein like numerals indicate like elements, and in which.

DETAILED DESCRIPTION

Figure 1:
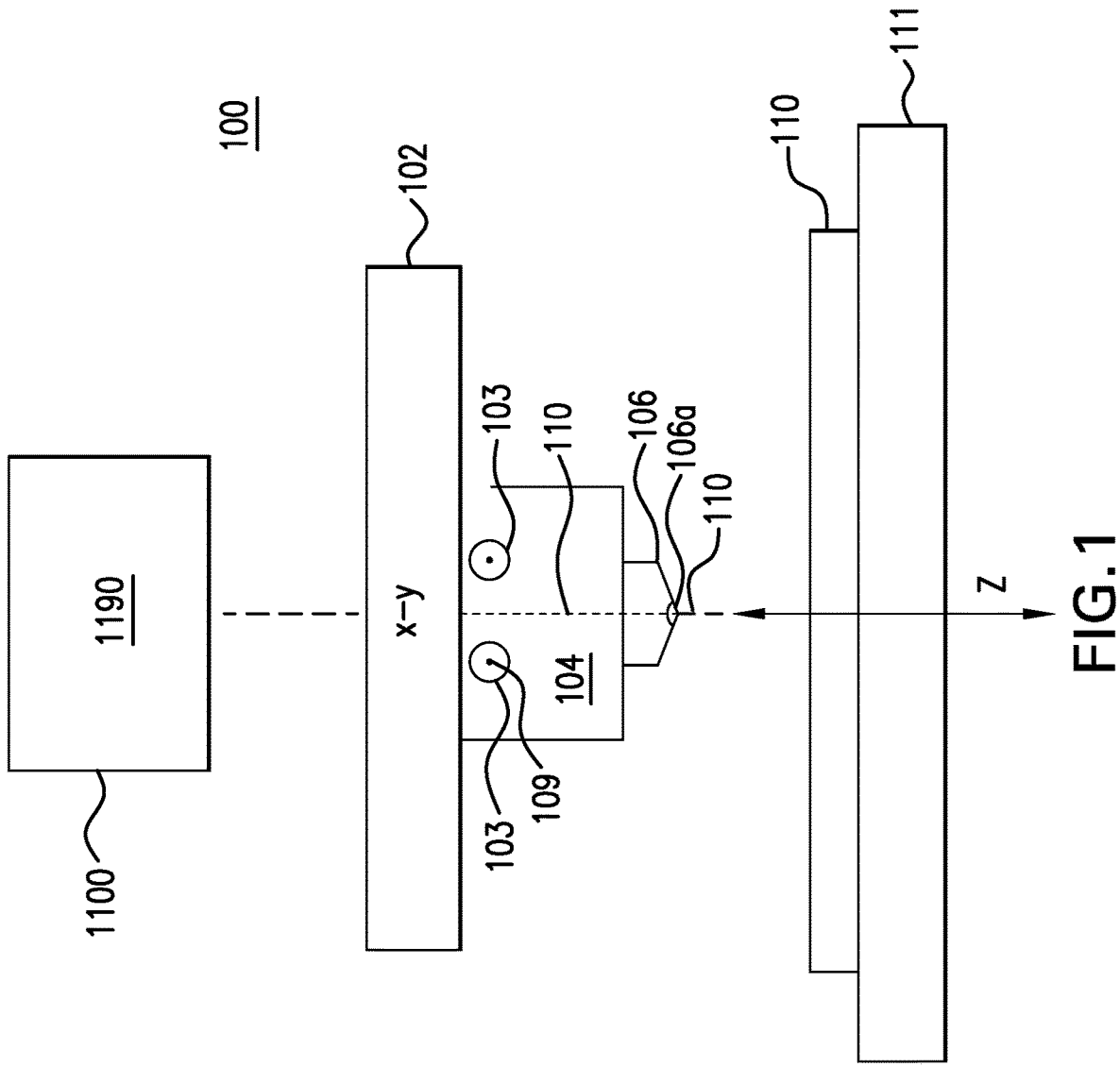
FIG. 1 is an illustration of an additive manufacturing printer.

The figures and descriptions provided herein may have been simplified to illustrate aspects that are relevant for a clear understanding of the herein described apparatuses, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, for the sake of brevity a discussion of such elements and operations may not be provided herein. However, the present disclosure is deemed to nevertheless include all such elements, variations, and modifications to the described aspects that would be known to those of ordinary skill in the art.

Embodiments are provided throughout so that this disclosure is sufficiently thorough and fully conveys the scope of the disclosed embodiments to those who are skilled in the art. Numerous specific details are set forth, such as examples of specific components, devices, and methods, to provide a thorough understanding of embodiments of the present disclosure. Nevertheless, it will be apparent to those skilled in the art that certain specific disclosed details need not be employed, and that embodiments may be embodied in different forms. As such, the embodiments should not be construed to limit the scope of the disclosure. As referenced above, in some embodiments, well-known processes, well-known device structures, and well-known technologies may not be described in detail.

The terminology used herein is for the purpose of describing particular embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred or required order of performance. It is also to be understood that additional or alternative steps may be employed, in place of or in conjunction with the disclosed aspects.

When an element or layer is referred to as being "on", "engaged to", "connected to" or "coupled to" another element or layer, it may be directly on, engaged, connected or coupled to the other element or layer, or intervening elements or layers may be present, unless clearly indicated otherwise. In contrast, when an element is referred to as being "directly on," "directly engaged to", "directly connected to" or "directly coupled to" another element or layer, there may be no intervening elements or layers present.

Other words used to describe the relationship between elements should be interpreted in a like fashion (e.g., "between" versus "directly between," "adjacent" versus "directly adjacent," etc.). Further, as used herein the term "and/or" includes any and all combinations of one or more of the associated listed items.

Yet further, although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the embodiments.

As discussed herein, improved print head embodiments are sought: in which print head speed and feed force may be improved without the referenced detrimental effects, such as lagging or jamming; in which printing precision may be improved; and in which printing responsiveness is improved. Print head speed may be improved in the disclosed embodiments and their equivalents to, for example, 100 $mm^3$ or more per second; precision may be improved, such as to 0.0003 $mm^3$ or better per count, such as with a 10 micrometer trace length resolution at a 400 micrometer wide and 100 micrometer thick trace; and responsiveness may be improved, such as to a 1 kHz system or better response with a 2 microsecond slam stop.

FIG. 1 is a block diagram illustrating an exemplary filament-based printer 100. In the illustration, the printer includes an X-Y axis driver 102 suitable to move the print head 104, and thus the print nozzle 106 on the print head 104, in a two dimensional plane, i.e., along the X and Y axes. Further included in the printer 100 for additive manufacturing are the aforementioned print head 104, including print nozzle 106. As is evident from FIG. 1, printing may occur upon the flow of heated print filament material outwardly from the nozzle 106 along a Z axis with respect to the X-Y planar movement of the X-Y driver 102. Thereby, layers of print filament material 110 may be provided from the nozzle 106 onto the build plate 111 along a path dictated by the X-Y driver 102.

More particularly, filament-based 3D printers include an extruding print head 104 that uses the hobs 103 to move the print filament material 110 into the heated nozzle 106 with great precision and at a highly controlled feed rate tied to the controller/control computing system 1100 executing the print plan algorithm 1190 via the X-Y-Z axis driver 102. A motor 109 is generally used to drive a driven one of the hobs 103 against an undriven one of the hobs 103. The driven hob 103 may be, as discussed herein, a knurled, recessed, and/or toothed wheel. The undriven hob may comprise, by way of non-limiting example, a pinching roller. The friction between the hobs 103 applies force to the print filament material 110 to impart the feed motion to the print filament material material 110 when the hobs rotate. Typical extruder forces in the known art vary from 2 to 14 lbs of force.

The embodiments herein may provide an extruder capable of 30 lbs of peak force, such as using a 1.75 mm print filament material. The embodiments may even provide a peak drive force of 40 lbs or more of force with larger print filament material sizes, and thus also provide operational force well in excess of the known art.

Figure 2:
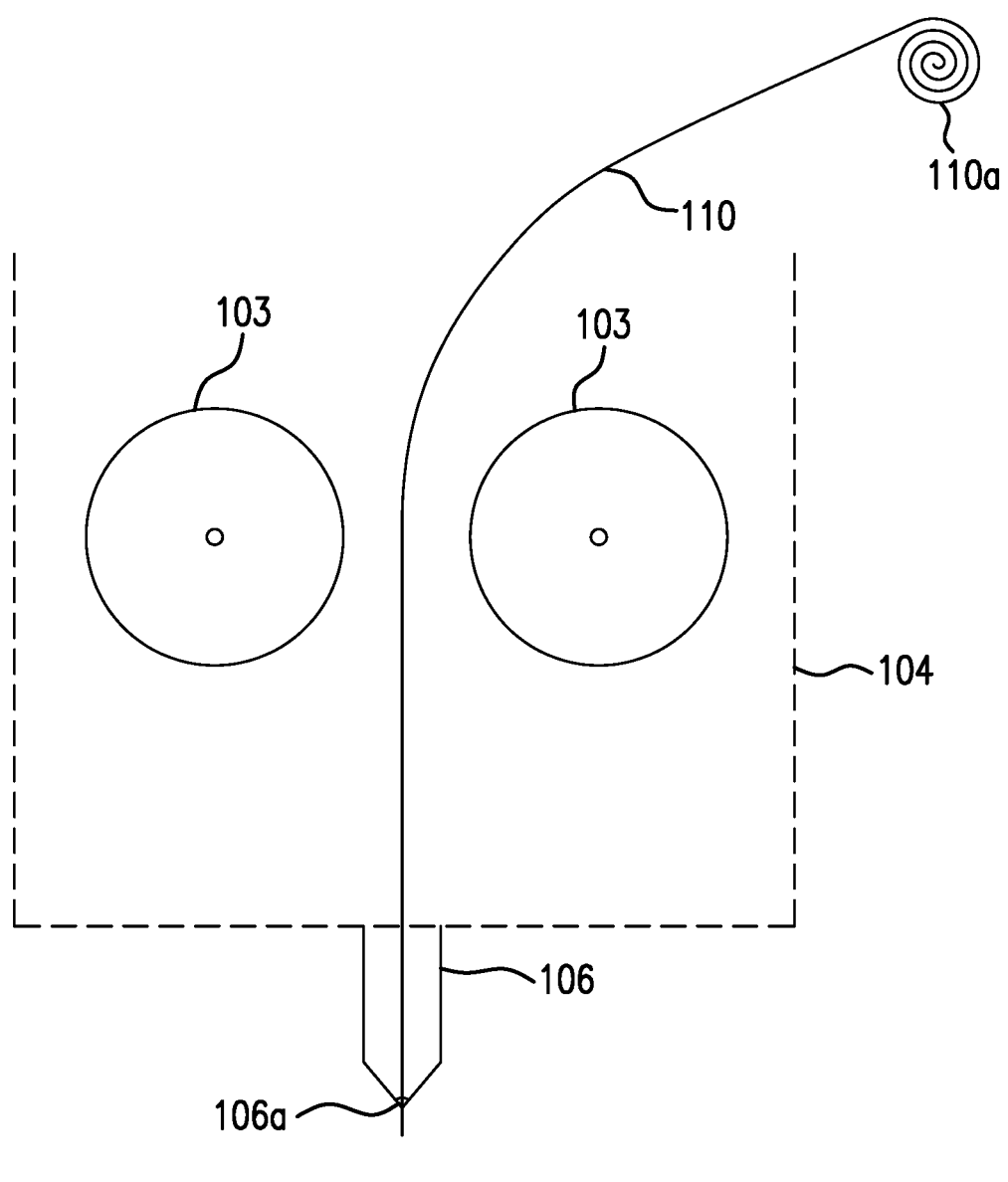
FIG. 2 is an illustration of an exemplary additive manufacturing system.

FIG. 2 illustrates with greater particularity a print head 104 having nozzle 106 for an exemplary additive manufacturing device, such as a 3-D printer, such as a FDM printer. As illustrated, the print filament material 110 is extruded via hobs 103 of the head 104 from a spool of print filament material 110a into and through the heated nozzle 106. As the nozzle 106 heats the print filament material 110, the print filament material is at least partially liquefied for output from an end port 106a of the nozzle at a point along the nozzle distal from the print head 104. Thereby, the extruded material is "printed" outwardly from the port 106a via the Z axis along a X-Y planar path determined by the X-Y driver (see FIG. 1) connectively associated with the print head 104.

The embodiments may provide the foregoing improvements to the print head 104 by, among other things, providing improved hobs 103 to grip the print material print filament material 110 from the print filament material spool 110a. FIG. 3 illustrate the "engagement length" 304a of a hob with the print filament material 110, as those terms are used herein. In the current art, this engagement length 304a typically results from hobs having diameters in the range of 8 to 12 or 15 mm.

Figure 3A:
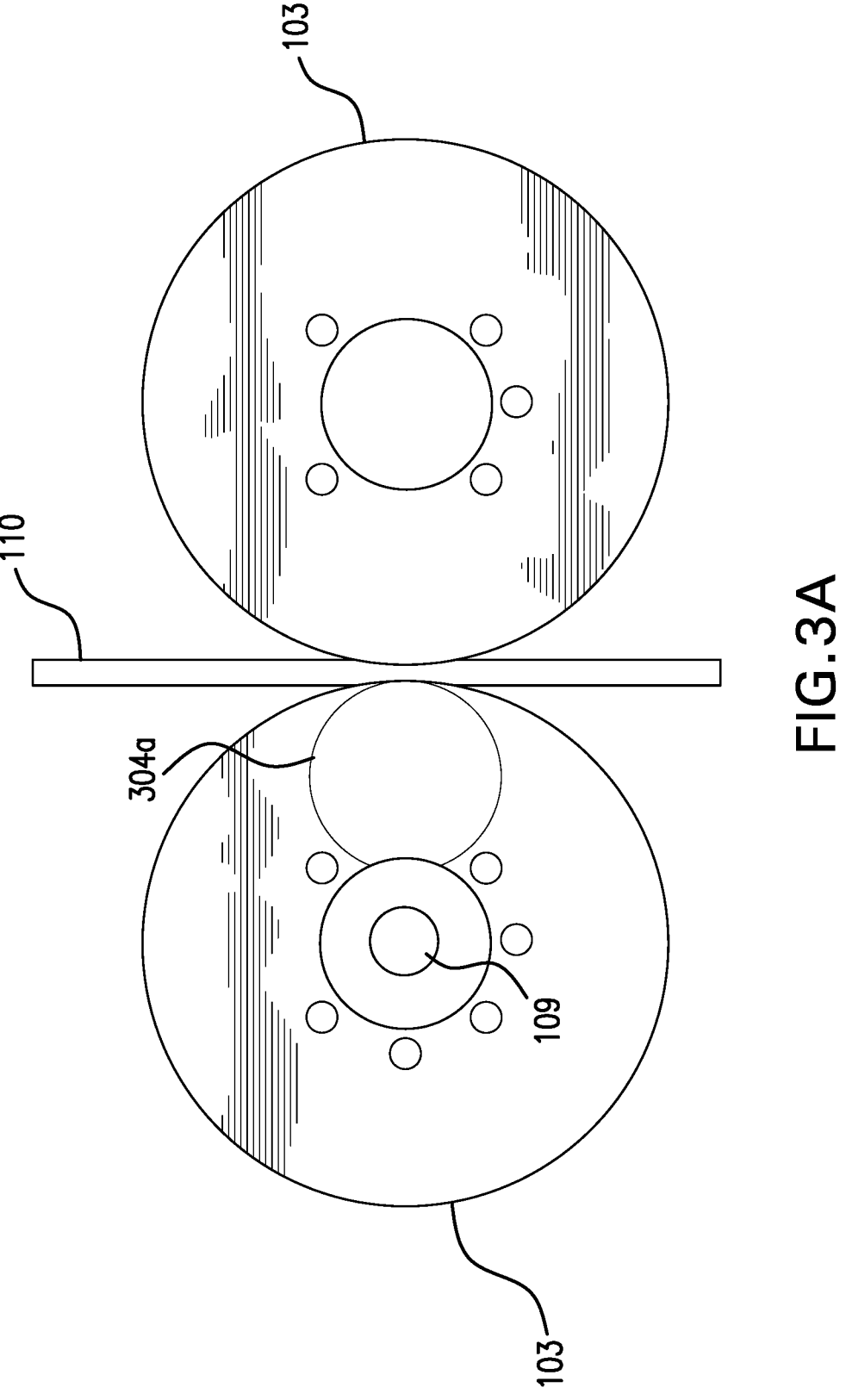
FIGS. 3A and 3B illustrate hobs of an additive manufacturing print head.
Figure 3B:
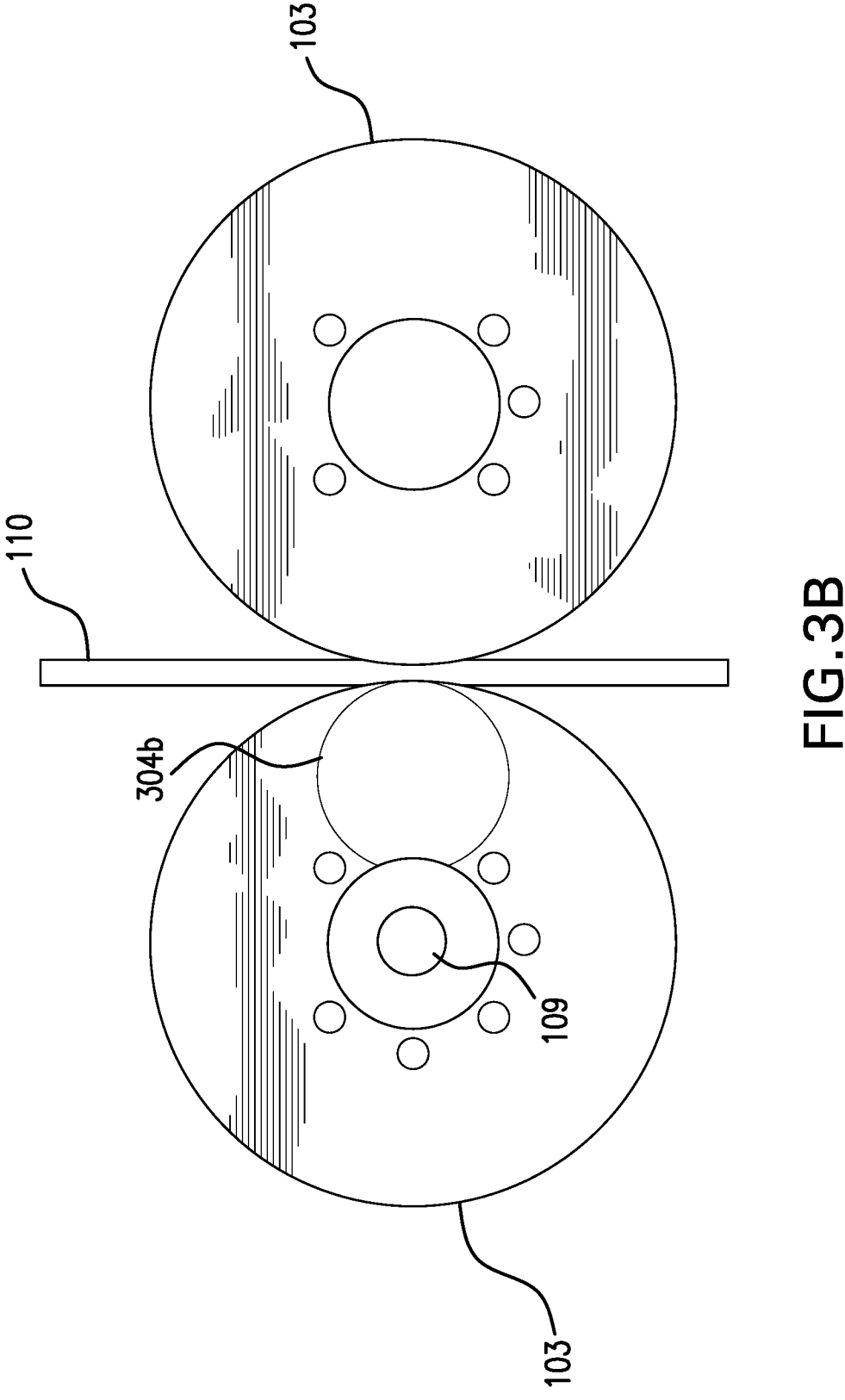

The gripping of the print filament material 110 by hobs 103 having smaller diameters of 8 to 12 mm, and hence smaller engagement lengths 304a, is illustrated with respect to FIG. 3A. Certain of the embodiments improve the engagement length 304 by increasing the engagement surface, that is, by increasing the diameter of the hobs 103 to enhance the engagement length 304b with the print filament material 110, as illustrated in FIG. 3B. Such increased diameter hobs 103 may, for example, have a diameter in the 20-40 mm range. The larger hob diameter in the illustrated embodiments enables significantly enhanced hob feed force, as discussed throughout.

Figure 4:
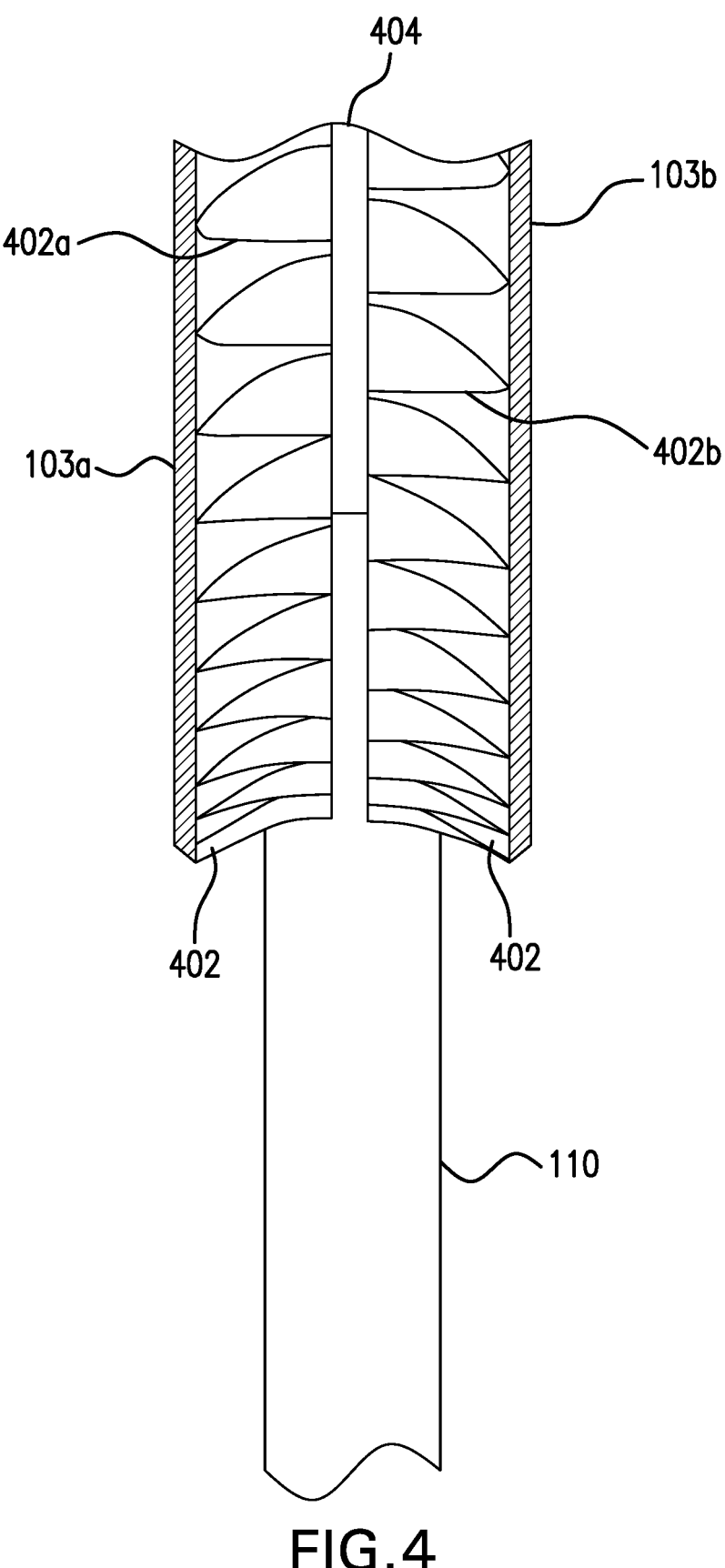
FIG. 4 illustrates hobs of an additive manufacturing print head.

Further and as illustrated in the exemplary embodiments of FIG. 4, a series of teeth 402a, 402b may be provided on each hob 103, or on each half hob 103a, 103b. The teeth 402 may, by way of non-limiting example, have sharpened surfaces, such as in order to enhance grip on print filament material 110.

In certain embodiments, the teeth 402 of the hob 103 may be offset with respect to the matched set of teeth 402a, 402b on each hob half 103a, 103b by a predetermined offset amount, such as 180 degrees. More particularly, such misalignment may be between 5 degrees and 180 degrees, and may occur by sheer random association of the two hob halves. Moreover, the two hob halves may be provided with a shim therebetween, such that the shim 404 may be selected based on the desired grip level to be provided by the hob once the two halves are joined.

Of note, overly sharpened teeth 402 may bite undesirably significantly into the print filament material 110, thereby increasing drag, and as such teeth 402 may be sandblasted, plated, or offset but with non-sharpened surfaces (such as square or spherical print filament material grip surfaces), or offset but with varying teeth shapes (such as varying between triangular, square, and spherical grip surfaces), and so on.

Of course, hob halves 103a, 103b may be consistently manufactured in the same manner, and thus the teeth 402a, 402b may be offset only upon interconnection of the hob halves 103a, 103b. Therefore, adjustability, such as an adjustable shim 404, may be provided between hob halves 103a, 103b in order to adjust the grip level of the hobs 103 onto the print filament material 110. Increased grip provided by the hobs 103 may allow for a correspondent decrease in the diameter of the hobs 103 over that referenced above in relation to FIGS. 3, due, in part, to the decreased necessity of an increase in engagement length 304 in light of the enhanced grip. Additionally and alternatively, the number of teeth 402 in a hob 103 may be reduced, but with the teeth 402 still staggered, so long as an engagement length 304 along the print filament material 110 maintains a predetermined level of friction in order to meet the characteristics discussed throughout.

In accordance with the foregoing, very high levels of grip on print filament material 110 with very low loss (i.e., drag/friction) may thus provided by certain of the embodiments. Moreover, hob diameter may be adjusted over the known art to vary across print environments to provide only the necessary level of torque, such as for a given print filament material 110 or a given printing technique. The foregoing may also lead to decreased costs, such as due to the ready replaceability of the hobs 103, which may also improve the time needed to clean and service a print head 104.

Figure 5:
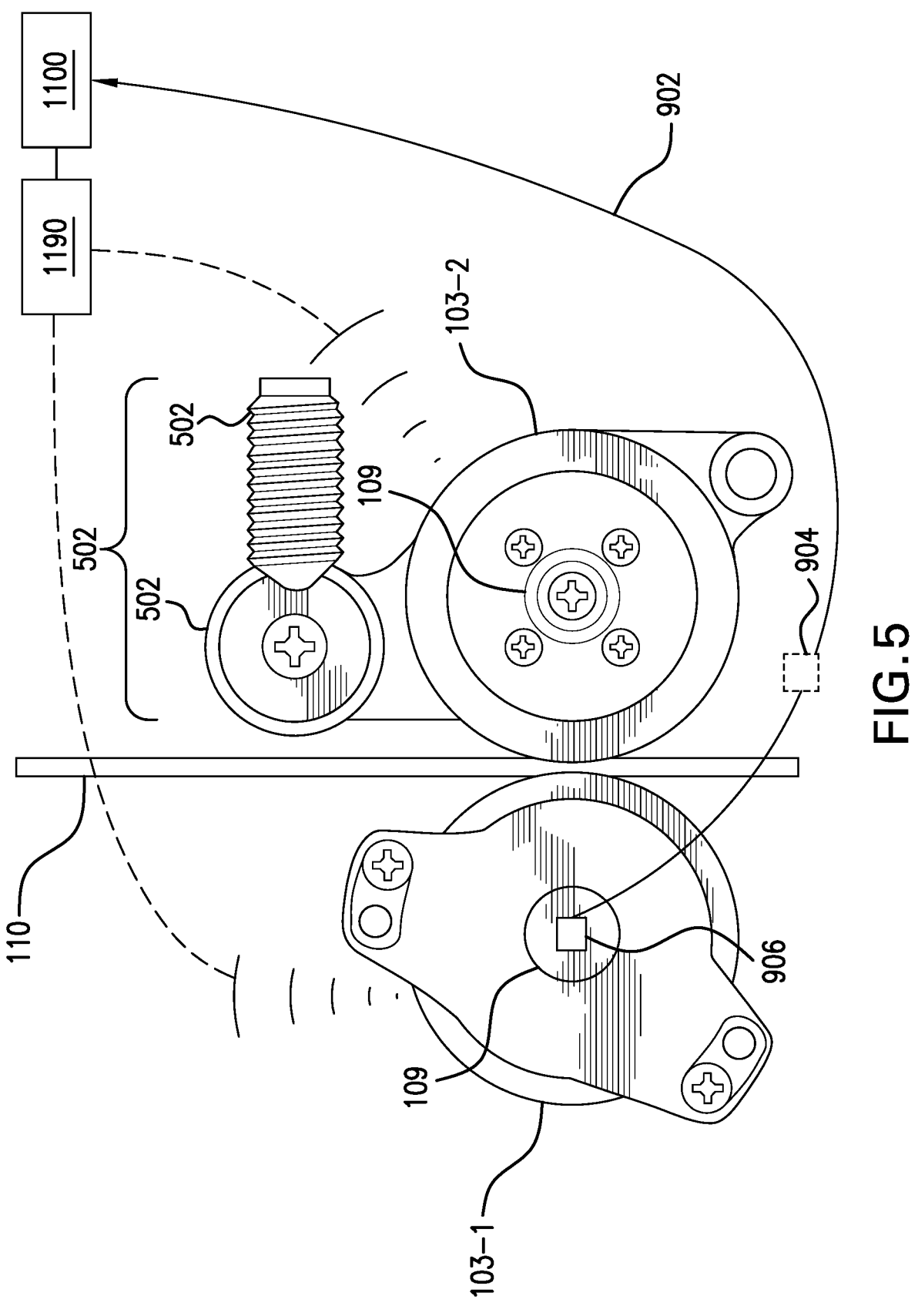
FIG. 5 illustrates a hob system for an additive manufacturing print head.

FIG. 5 illustrates an exemplary assembly for hobs 103 according to certain of the embodiments. As illustrated, only the "drive hob" 103-1 may be driven by a motor 109 in certain of the embodiments, whereas the opposing hob 103-2 may be passive, and the driven hob 103-1 may include, in association therewith, one or more force adjustments 502 to adjust the force applied by the hobs, such as particularly by the passive hob 103-2, to the print filament material 110. More particularly, the force adjustment 502 may be provided not only on the non-driven hob 103-2, but additionally on the driven hob 103-1, or on both hobs.

Of course, it will be appreciated that the control of feed force and resolution may be enhanced if both hobs 103-1 and 103-2 are driven. Driving both hobs 103-1, 103-2 via motors 109 allows for the contacting of the t print filament material 110 on two sides thereof, to better drive the print filament material. This approximate equivalency of the applied force to the print filament material on both sides thereof, and along a great length thereof corresponded to the enhanced hob size discussed herein, better avoids the damage to the print filament material geometry that is caused in the known art by the affirmative application of force to only one side of the print filament material.

More particularly, multi-positional extrusion forces from multiple driven hobs 103-1, 103-2 also decreases stress forces on the print filament material 110 at least in that, for a given force, dual driven-hobs 103 allow the force load to be applied, and thus distributed, to multiple areas of the print filament material, thus greatly reducing the point-force and single side-force loads that would otherwise be applied to single aspects of the print filament material 110. This multi-point force distribution thereby avoids the deformation in print filament material geometry and print filament material melt and flow impedance of the known art.

Dual driven hobs may further enhance the feed force and resolution via other means. For example, servo-motor feedback from each hob drive motor 109 may enable more intelligent motion of hobs 103-1, 103-2, both with regard to print filament material 110, heating 106 (see above), and each other 103-1, 103-2. This may occur, by way of example, by the passing of feedback 902 from each motor 109 to controller/control computing system 1100, and decisions on motor control from controller/control computing system 1100 based on application of algorithm 1190 to motor(s) 109. This feedback may be provided directly, such as by reading motor current, and/or by one or more sensors

904 and/or motor encoders 906 provided to generate data indicate of print and motor performance. Correspondingly, all of the foregoing forces, i.e., between the hobs 103, as applied to print filament material 110, that dictates feed speed to nozzle 106, and so on, may be fully programmable to algorithm 1190 in the embodiments.

The improvements to the extruding print head provided in the embodiments enable acceleration and deceleration of the print filament material at a much higher rates than in the known art. That is, the X-Y stage driver may accelerate and decelerate more quickly than in the known art, and the extruder nevertheless maintains proper material flow. Of note, improved deceleration also enhances retraction of the print filament material, which avoids dripping, thereby improving both nozzle performance the nozzle tip cleaning process.

Increased extruder force and control additionally allows for the print filament material to be better pushed through the inlet plugs that may arise if the print filament material heating and feed force is mismatched, as discussed herein. Further, improved extruder force and adjustable control enables changes in the print filament material drag between the material spool and the print head to be readily overcome. Yet further, the improved rotation rate and rate-tolerance in the embodiments also leads to more repeatable and precise bead size at the print nozzle.

Yet further, there occurs a pressure decay in the nozzle when print speed is dramatically changed. In order to address this pressure decay, substantial performance out of the extruder is required, which includes both the force and the acceleration rate of the print filament material. That is, the quicker the acceleration, the more force that is generated. This high force allows the system to have the capability to drive very high acceleration and deceleration rates without slipping. For example, for purposes of a corner print, the controller/control computing system 1100 may perform a suck back before and during a slow down to address lead, such as slowing to zero at the corner. Thereafter, a pre-pump may be performed as the corner is exited, driving to the desired speed, thus addressing lag.

Impulse is the change of momentum of an object when the object is acted upon by a force for an interval of time. That is, Impulse=Force*time=force*Delta t. As such, an impulse calculation by the controller/control computing system 1100 may be suitable to indicate the variations in print filament material driving for particular aspects of the print plan, such as are discussed in the example immediately above.

Figure 6:
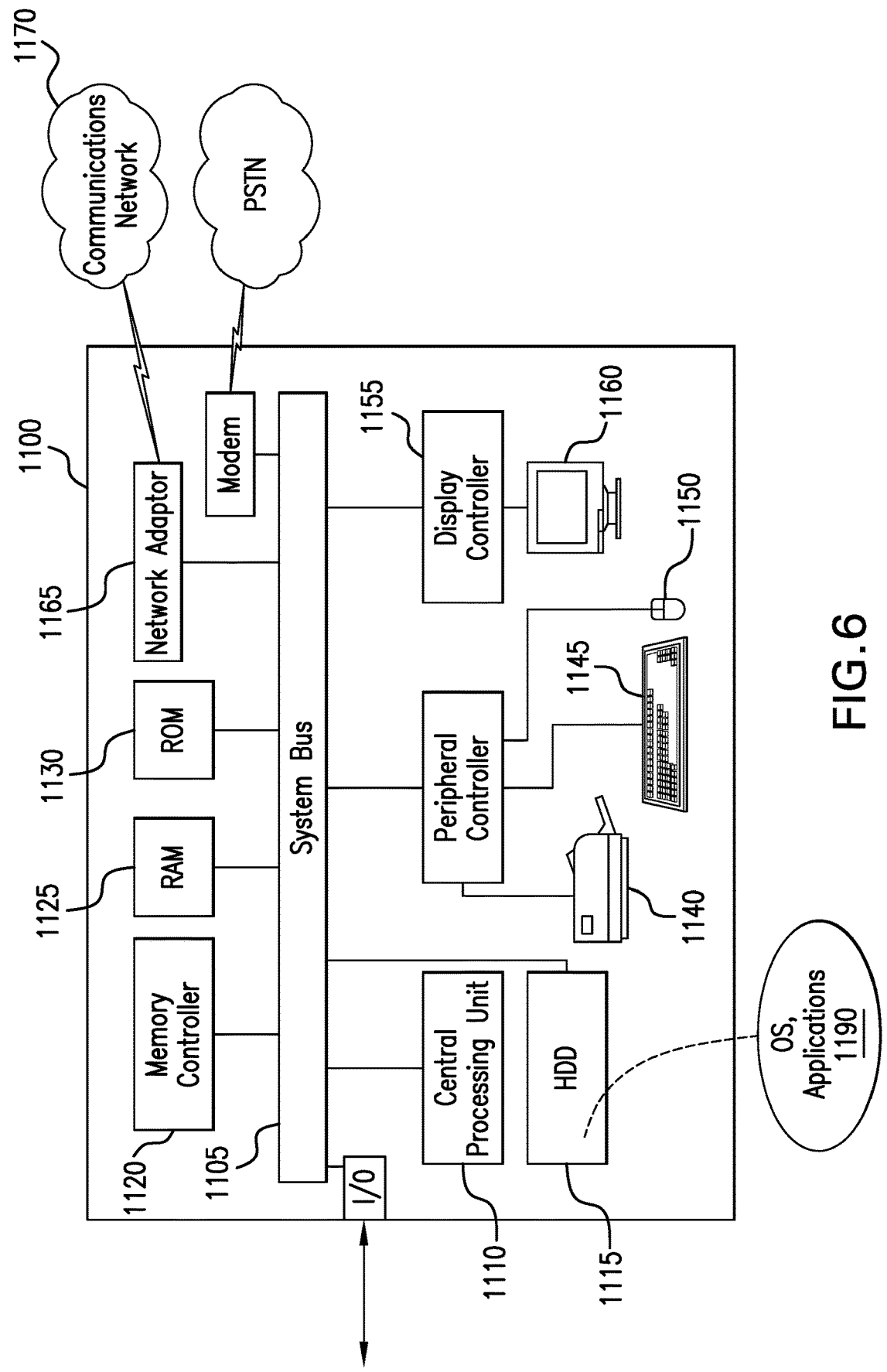
FIG. 6 illustrates an exemplary controller/control computing system.

FIG. 6 depicts an exemplary controller/control computing system 1100 for use as the controller/control computing system 1100 in association with the herein described systems and methods. Controller/control computing system 1100 is capable of executing software, such as an operating system (OS) and/or one or more computing applications/algorithms 1190, such as applications applying the print plan and control algorithms discussed herein, and may execute such applications, such as to control one or more hob motors by sending data from, and by using data, such as sensor data, such as in the form of feedback 902, received at, the I/O port.

The operation of exemplary controller/control computing system 1100 is controlled primarily by computer readable instructions, such as instructions stored in a computer readable storage medium, such as hard disk drive (HDD) 1115, optical disk (not shown) such as a CD or DVD, solid state drive (not shown) such as a USB "thumb drive," or the like. Such instructions may be executed within central processing unit (CPU) 1110 to cause controller/control computing system 1100 to perform the operations discussed throughout. In many known computer servers, workstations, personal computers, and the like, CPU 1110 is implemented in an integrated circuit called a processor.

It is appreciated that, although exemplary controller/control computing system 1100 is shown to comprise a single CPU 1110, such description is merely illustrative, as controller/control computing system 1100 may comprise a plurality of CPUs 1110. Additionally, controller/control computing system 1100 may exploit the resources of remote CPUs (not shown), for example, through communications network 1170 or some other data communications means.

In operation, CPU 1110 fetches, decodes, and executes instructions from a computer readable storage medium, such as HDD 1115. Such instructions may be included in software such as an operating system (OS), executable programs, and the like. Information, such as computer instructions and other computer readable data, is transferred between components of controller/control computing system 1100 via the system's main data-transfer path. The main data-transfer path may use a system bus architecture 1105, although other computer architectures (not shown) can be used, such as architectures using serializers and deserializers and crossbar switches to communicate data between devices over serial communication paths. System bus 1105 may include data lines for sending data, address lines for sending addresses, and control lines for sending interrupts and for operating the system bus. Some busses provide bus arbitration that regulates access to the bus by extension cards, controllers, and CPU 1110.

Memory devices coupled to system bus 1105 may include random access memory (RAM) 1125 and/or read only memory (ROM) 1130. Such memories include circuitry that allows information to be stored and retrieved. ROMs 1130 generally contain stored data that cannot be modified. Data stored in RAM 1125 can be read or changed by CPU 1110 or other hardware devices. Access to RAM 1125 and/or ROM 1130 may be controlled by memory controller/control computing system 1120. Memory controller/control computing system 1120 may provide an address translation function that translates virtual addresses into physical addresses as instructions are executed. Memory controller/control computing system 1120 may also provide a memory protection function that isolates processes within the system and isolates system processes from user processes. Thus, a program running in user mode may normally access only memory mapped by its own process virtual address space; in such instances, the program cannot access memory within another process' virtual address space unless memory sharing between the processes has been set up.

In addition, controller/control computing system 1100 may contain peripheral communications bus 135, which is responsible for communicating instructions from CPU 1110 to, and/or receiving data from, peripherals, such as peripherals 1140, 1145, and 1150, which may include printers, keyboards, and/or the sensors, encoders, and the like discussed herein throughout. An example of a peripheral bus is the Peripheral Component Interconnect (PCI) bus.

Display 1160, which is controlled by display controller/control computing system 1155, may be used to display visual output and/or presentation generated by or at the request of controller/control computing system 1100, responsive to operation of the aforementioned computing program. Such visual output may include text, graphics, animated graphics, and/or video, for example. Display 1160 may be implemented with a CRT-based video display, an LCD or LED-based display, a gas plasma-based flat-panel display, a touch-panel display, or the like. Display controller/ control computing system 1155 includes electronic components required to generate a video signal that is sent to display 1160.

Further, controller/control computing system 1100 may contain network adapter 1165 which may be used to couple controller/control computing system 1100 to external communication network 1170, which may include or provide access to the Internet, an intranet, an extranet, or the like. Communications network 1170 may provide user access for controller/control computing system 1100 with means of communicating and transferring software and information electronically. Additionally, communications network 1170 may provide for distributed processing, which involves several computers and the sharing of workloads or cooperative efforts in performing a task. It is appreciated that the network connections shown are exemplary and other means of establishing communications links between controller/control computing system 1100 and remote users may be used.

Network adapter 1165 may communicate to and from network 1170 using any available wired or wireless technologies. Such technologies may include, by way of non-limiting example, cellular, Wi-Fi, a wireless communication methodology, such as Bluetooth®, infrared, or the like.

It is appreciated that exemplary controller/control computing system 1100 is merely illustrative of a computing environment in which the herein described systems and methods may operate, and does not limit the implementation of the herein described systems and methods in computing environments having differing components and configurations. That is to say, the concepts described herein may be implemented in various computing environments using various components and configurations.

In the foregoing detailed description, it may be that various features are grouped together in individual embodiments for the purpose of brevity in the disclosure. This method of disclosure is not to be interpreted as reflecting an intention that any subsequently claimed embodiments require more features than are expressly recited.

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed herein.

What is claimed is:

1. A print head to increase an engagement length on a print filament for enhanced grip of the print filament for additive manufacturing, comprising:

a first hob comprising a first diameter greater than 20 mm;

a second hob comprising a second diameter greater than 20 mm;

wherein each hob comprises two halves;

an adjustable shim configured to reposition at least one of the first hob and the second hob to modify grip on the print filament between the first hob and the second hob, wherein the adjustable shim is generally disposed between the two halves of the first hob or the second hob;

wherein the first diameter and the second diameter are arranged to fit a 1.75 mm print material filament between the first and second hobs;

at least one motor; and at least one output nozzle having a heater to partially liquefy the print filament, wherein the at least one motor is operatively coupled to at least one of the first and second hobs to drive the print filament past the heater and through the at least one output nozzle upon the at least partial liquefication to provide the additive manufacturing, wherein the first diameter of the first hob and the second diameter of the second hob each comprise less than 40 mm.

2. A print head for additive manufacturing, comprising:

a controller comprising a print plan to execute the additive manufacturing;

two proximate hobs each comprising a diameter of greater than 15 mm and being arranged, based on their respective diameters, so as to grip and drive a 1.75 mm print filament, wherein each hob comprises two halves;

an adjustable shim configured to modify a grip of the two proximate hobs, wherein the adjustable shim is generally disposed between the two halves of at least one of the two proximate hobs;

at least one motor communicatively coupled with the controller and capable of imparting a rotation to a respective one of the two hobs to drive the print filament, wherein an extrusion of a partial liquefication of the print filament ultimately results from the rotation; and an interface to a liquefier capable of the partial liquefication by at least one nozzle heater for output of the partial liquefication as the additive manufacturing;

wherein the controller is configured to receive feedback from the at least one motor, wherein the controller is configured to modify rotation of the respective one of the two hobs based on the print plan and the feedback received from the at least one motor, and wherein the modified rotation of the respective one of the two hobs consequently modifies movement of the print filament.

3. The print head of claim 2, further comprising a force adjuster configured to increase a contact area of at least one of the two hobs on the print filament.

4. The print head of claim 2, wherein the hobs further comprise a grip area configured to mate around the print filament.

5. The print head of claim 2, wherein the controller is communicatively coupled with an X-Y axis positional driver capable of positioning the print head, and wherein the controller coordinates operation of the at least one motor with the X-Y axis positional driver based at least on motor performance and the print plan.

6. The print head of claim 2, wherein the controller receives the feedback regarding the additive manufacturing from an encoder of the at least one motor.

7. The print head of claim 2, wherein the modification comprises a variation in operation of the at least one motor, wherein the variation comprises a rotation rate.

8. The print head of claim 7, wherein the variation further comprises one of an acceleration and a deceleration of the rotation rate of the at least one motor.

9. The print head of claim 2, wherein the at least one motor comprises a stepper motor.

10. The print head of claim 2, wherein the diameter of the hobs provides enhanced force on the print filament to push through an inlet plug at the interface.

11. The print head of claim 2, further comprising at least one encoder associated with each motor of the at least one motor.

12. The print head of claim 2, further comprising at least one sensor that senses at least one of the at least one motor, the hobs and the interface.

13. The print head of claim 2, wherein the controller receives the feedback regarding the additive manufacturing from a current of the at least one motor.

14. The print head of claim 2, wherein the controller receives the feedback regarding the additive manufacturing from a sensor of the at least one motor.

15. The print head of claim 2, wherein the rotation of the arranged two proximate hobs is capable of imparting a drive force of at least 30 lbs.

16. The print head of claim 2, wherein the two proximate hobs are provided in a first set with a first diameter, and wherein a second set of two proximate hobs with a second diameter are configured to replace the first set of two proximate hobs.

17. A print head to increase an engagement length on a print filament for enhanced grip of the print filament for additive manufacturing, comprising:

a controller comprising a print plan to execute the additive manufacturing;

a first hob comprising a first diameter greater than 20 mm;

a second hob comprising a second diameter greater than 20 mm;

wherein each hob comprises two halves;

wherein the first diameter and the second diameter are arranged to fit a 1.75 mm print material filament between the first and second hobs;

an adjustable shim configured to reposition at least one of the first hob and the second hob to modify grip on the print filament between the first hob and the second hob, wherein the adjustable shim is generally disposed between the two halves of the first hob or the second hob;

at least one motor; and at least one output nozzle having a heater to partially liquefy the print filament, wherein the at least one motor is operatively coupled to at least one of the first and second hobs to drive the print filament past the heater and through the at least one output nozzle upon the at least partial liquefication to provide the additive manufacturing, wherein the controller detects a change in the print plan indicative of needed variation in the drive to comport with the print plan.

18. The print head of claim 17, wherein the at least one motor consists of a first motor and a second motor, wherein the first motor drives the first hob and the second motor drives the second hob, and wherein the controller controls at least one of the first motor and the second motor based on at least one of:

motor feedback received from the first motor and the second motor, the print plan, a desired print resolution, and a difference between at least one of current and desired position and speed of an X-Y axis positional driver.

* * * * *